United States Patent [19]

Lundy et al.

[11] Patent Number: 4,873,271

[45] Date of Patent: Oct. 10, 1989

[54] GAMMA RADIATION RESISTANT POLYCARBONATE COMPOSITIONS

[75] Inventors: Charles E. Lundy; Sivaram Krishnan, both of Pittsburgh, Pa.

[73] Assignee: Mobay Corporation, Pittsburgh, Pa.

[21] Appl. No.: 342,918

[22] Filed: Apr. 25, 1989

[51] Int. Cl.$^4$ ............................................... C08K 5/10
[52] U.S. Cl. .................... 523/136; 524/292; 524/299; 524/306; 524/308
[58] Field of Search ............... 523/136; 524/292, 299, 524/306, 308

[56] References Cited

U.S. PATENT DOCUMENTS

| | | | |
|---|---|---|---|
| 4,431,497 | 2/1984 | Rekers | 524/299 |
| 4,451,641 | 5/1984 | Sublett et al. | 528/295.5 |
| 4,460,445 | 7/1984 | Rekers | 204/159.2 |
| 4,624,972 | 11/1986 | Nace | 523/136 |
| 4,657,949 | 4/1987 | Nace | 523/137 |
| 4,804,692 | 2/1989 | Lundy et al. | 523/137 |

FOREIGN PATENT DOCUMENTS 152012 1/1985 European Pat. Off. .

Primary Examiner—Veronica P. Hoke
Attorney, Agent, or Firm—Gene Harsh; Joseph C. Gil; Aron Preis

[57] ABSTRACT

The invention relates to thermoplastic polycarbonate molding compositions which are rendered improved resistance to gamma-radiation by the incorporation therewith of about 0.05 to about 5.0 percent by weight of an ester of poly(alkylene)oxide conforming to

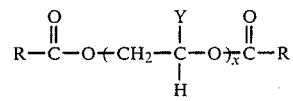

wherein R is a $C_1$–$C_{20}$ alkyl, aryl or alkylaryl, Y denotes a hydrogen atom or a $C_1$–$C_6$ alkyl radical, and X is about 1 to 40, preferably 5 to 30.

The compositions of the invention exhibit excellent resistance to yellowness and formation of haze which commonly characterize gamma irradiated articles molded from polycarbonate.

7 Claims, No Drawings

GAMMA RADIATION RESISTANT POLYCARBONATE COMPOSITIONS

FIELD OF THE INVENTION

The invention is directed to polycarbonate molding compositions and more particularly, to thermoplastic compositions resistant to gamma radiation.

SUMMARY OF THE INVENTION

The invention relates to thermoplastic polycarbonate molding compositions which are rendered resistant to gamma-radiation by the incorporation therewith of about 0.05 to about 5.0 percent by weight of an ester of poly(alkylene)oxide conforming to

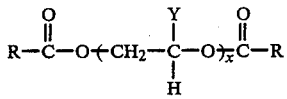

wherein R is a $C_1$-$C_{20}$ alkyl, aryl or alkylaryl, Y denotes a hydrogen atom or a $C_1$-$C_6$ alkyl radical, and X is about 1 to 40, preferably 5 to 30.

The compositions of the invention exhibit excellent resistance to yellowness and formation of haze which commonly characterize gamma irradiated articles molded from polycarbonate.

BACKGROUND OF THE INVENTION

Because of its physical and mechanical properties polycarbonate resins were found to be eminently suitable for a variety of applications in the medical field. Applications which require sterilization by exposure to gamma radiation present a problem since polycarbonate tends to yellow and show increased haze. The art is noted to include U.S. Pat. No. 4,624,972 which disclosed polycarbonate compositions resistant to gamma radiation containing an ester of an aromatic polycarboxylic acid. European Patent Application 152,012 disclosed a method for increasing the the composition a non-polymeric compound which is characterized by a strong oxidizing action and/or reaction at high reaction rate with active species such as E or OH radicals or hydrated electrons formed by ionizing radiation. U.S. Pat. No. 4,451,641 disclosed a container prepared from a copolyester which has been modified with either a dimer acid or a dimer glycol. The copolyester is said to have an improved resistance to gamma radiation. Radiation stable polyolefin compositions have been disclosed in U.S. Pat. No. 4,460,445. Copending U.S. patent applications Ser. No. 305,301 filed Feb. 1, 1989 and No. 297,264 filed Jan. 18, 1989 relates to relevant technology.

DETAILED DESCRIPTION OF THE INVENTION

The composition of the invention comprises a polycarbonate resin and a stabilizing agent in an amount sufficient to enhance the resistance of the resin to yellowness upon exposure to gamma radiation. Preferably, the composition contains about 0.05 to 5.0, more preferably 0.1 to 3.0 percent of the stabilizing agent.

The polycarbonate resins useful in the practice of the invention are homopolycarbonates, copolycarbonates and terpolycarbonates or mixtures thereof. The polycarbonates generally have a weight average molecular weight of 10,000-200,000, preferably 20,000-80,000 and their melt flow rate, per ASTM D-1238 at 300° C., is about 1 to about 65 gm/10 min., preferably about 2-15 gm/10 min. They may be prepared, for example, by the known diphasic interface process from a carbonoc acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, 1964, all incorporated herein by reference).

In the present context, dihydroxy compounds suitable for the preparation of the polycarbonates of the invention conform to the structural formulae (1) or (2)

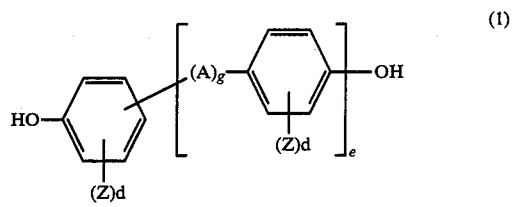

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —$SO_2$— or a radical conforming to

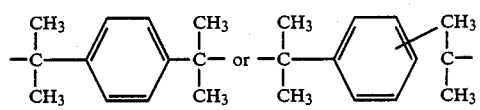

e and g both denote the number 0 to 1; Z denotes F, Cl, Br or $C_1$-$C_4$-alkyl and if several Z radicals are substituents in one aryl radical, they may be identical or different one from the other;

d denotes an integer of from 0 to 4; and f denotes an integer of from 0 to 3.

Among the dihydroxy compounds useful in the practice of the invention are hydroquinone, resorcinol, bis(-hydroxyphenyl)alkanes, bis-(hydroxyphenyl)ethers, bis-(hydroxyphenyl)-ketones, bis-(hydroxyphenyl)-sulfoxides, bis-(hydroxyphenyl)-sulfides, bis-(hydrxyphenyl)-sulfones, and α,α'-bis-(hydroxyphenyl)-diisopropyll-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenze, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, hydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenyl.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention will entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05-2.0 mol % (relative to the bisphenols) of polyhydroxyl compound. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxy-1-isopropylidine)-phenol; 2,6-bis-(2'-dihydroxy-5'-methylenzyl)-4-methylphenol; 2,4-dihydroxy-benzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol A based homopolycarbonate resins differing in terms of their respective molecular weights and characterized in that their melt flow indices (MFR) per ASTM D-1238 are about 16.5-24, 13-16, 7.5-13.0 and 3.5-6.5 gm/10 min., respectively. These are products of Mobay Corporation of Pittsburgh, Pa.

The stabilizer of the invention—a poly(alkylene oxide) derivative—may be prepared by reacting the appropriate polyalkylene glycol with an acid or acid chloride. For instance polypropylene glycol stearate by be prepared by reacting an equimolar amount of polypropylene glycol with stearoyl chloride in an organic solvent, such as methylene chloride or tetrahydrofuran and then extracting the residual acids or precipitating them in the form of an acid salt. Similarly, stearic acid or acetic acid may be used and known esterification catalysts may be employed.

The stabilizer conforms to

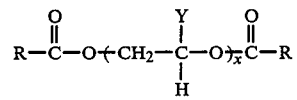

wherein R is a $C_1$-$C_{20}$ alkyl, aryl or alkylaryl radical, Y denotes a hydrogen atom or a $C_1$-$C_6$ alkyl radical and X is 1 to 40, preferably 5 to 30.

In the practice of the invention the stabilizer is added to the polycarbonate resin at a level of 0.05 to 5 preferably 0.1 to 3.0 percent, relative to the weight of the composition via extrusion techniques. Once extruded the composition may be molded by conventional methods for molding of thermoplastics.

The stabilizer of the invention was incorporated in a polycarbonate resin and specimens were molded from the composition. The specimens were subjected to gamma radiation and the change in yellowness index was measured and is reported below. The effect of the radiation was determined on specimens which were injected molded at 550° F.

In all the experiments, the polycarbonate was Makrolon 2608 resin which is a bisphenol-A based polycarbonate having a melt flow rate of about 11 gm/10 min per ASTM D-1238—a product of Mobay Corporation. In Table 1 there is shown the performance of specimens molded from a polycarbonate composition in accordance with the invention.

TABLE 1

| Composition | Added Stabilizer (%) | Yellowness Index (1) | Yellowness Index (2) |
|---|---|---|---|
| Makrolon 2608 | 0.0 | 3.87 | 42.91 |
| Makrolon 2608 + Stabilizer (3) | 0.5 | 3.24 | 24.85 |
| Makrolon 2608 + Stabilizer (3) | 1.0 | 2.60 | 17.96 |

(1) After molding.
(2) After exposure to 5.0 Mrads of gamma radiation.
(3) Polypropyleneglycol Stearate.

In Table 2 there is shown the yellowness index of specimens made from polycarbonate compositions which contain polypropylene glycol acetate.

TABLE 2

| Composition | Added Stabilizer (%) | Yellowness Index (1)* | Yellowness Index (3) |
|---|---|---|---|
| Makrolon 2608 | 0.0 | 3.42 | 42.91 |
| Makrolon 2608 + Stabilizer (2) | 0.5 | 2.50 | 42.91 |
| Makrolon 2608 + | | | |

TABLE 2-continued

| Composition | Added Stabilizer (%) | Yellowness Index (1) | Yellowness Index (3) |
|---|---|---|---|
| Stabilizer (2) | 1.0 | 2.45 | 19.53 |

(1) After molding.
(2) Polypropylene glycol acetate.
(3) After exposure to 5.0 Mrads of gamma radiation.

Other conventional additives may also be incorporated in the composition for their art-recognized utility. These include release agents, plasticizers, thermal and UV stabilizers, antioxidants, fillers, reinforcements and the like. Especially useful are thermal stabilizers such as phosphines, phosphites and phosphates which may advantageously be added to the stabilized composition of the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   (i) an aromatic polycarbonate resin and about 0.05 to 5.0% of
   (ii) a stabilizing agent conforming to

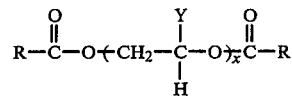

wherein R denotes a $C_1-C_{20}$ alkyl, aryl or alkylaryl radical, Y denotes a $C_1-C_6$ alkyl or a hydrogen atom and X is 1 to 40.

2. The composition of claim 1 wherein said (ii) is present in an amount of about 0.1 to 3.0 percent relative to the weight of the composition.

3. The composition of claim 1 wherein said R is an acetic acid derivative.

4. The composition of claim 1 wherein said R is a stearic acid derivative.

5. The composition of claim 1 wherein said polycarbonate is a homopolymer based on bisphenol A.

6. The composition of claim 1 wherein said Y is a hydrogen atom.

7. The composition of claim 1 wherein said X is 5 to 30.

* * * * *